United States Patent [19]

Tatsukami et al.

[11] Patent Number: 4,576,438
[45] Date of Patent: Mar. 18, 1986

[54] HEAT-RESISTING OPTICAL FIBER

[75] Inventors: Yoshiharu Tatsukami, Toyonaka; Yasuyuki Kato, Niihama; Shigeo Wake, Saijo, all of Japan

[73] Assignee: Sumitomo Chemical Company, Limited, Osaka, Japan

[21] Appl. No.: 504,861

[22] Filed: Jun. 16, 1983

[30] Foreign Application Priority Data

Jun. 17, 1982 [JP] Japan ................... 57-105069
Mar. 2, 1983 [JP] Japan ................... 58-34990
Mar. 7, 1983 [JP] Japan ................... 58-37741

[51] Int. Cl.$^3$ ............................................. G02B 5/14
[52] U.S. Cl. .................. 350/96.34; 428/373; 428/394
[58] Field of Search ............... 350/96.34; 428/373, 428/374, 394

[56] References Cited

U.S. PATENT DOCUMENTS 3,930,103  12/1975  Chimura et al. ................ 350/96.34

FOREIGN PATENT DOCUMENTS 2455265  6/1975  Fed. Rep. of Germany ... 350/96.34
49415  12/1976  Japan ................................. 350/96.34
1037498  7/1966  United Kingdom ............. 350/96.34

Primary Examiner—William L. Sikes
Assistant Examiner—Frank Gonzalez
Attorney, Agent, or Firm—Birch, Stewart, Kolasch & Birch

[57] ABSTRACT

A heat-resisting optical fiber comprising a core and a cladding, characterized in that the core is made of a polymer comprising units of a methacrylic ester, of which the ester moiety has an alicyclic hydrocarbon group of not less than 8 carbon atoms, and the cladding is made of a transparent polymeric material having a refractive index of at least 3% smaller than that of the core. This optical fiber has excellent heat resistance and good flexibility and can be used at a high temperature over 110° C.

10 Claims, No Drawings

HEAT-RESISTING OPTICAL FIBER

BACKGROUND AND SUMMARY OF THE INVENTION

The present invention relates to an optical fiber. More particularly, it relates to a heat-resisting flexible optical fiber comprising a core and a cladding.

Conventional optical fibers are made from glass materials and widely used as optical signal-transmitting mediums for instrumentation between instruments or in an instrument, for transmission of data, for medical use, for decoration, for transmission of image, etc. However, they are poor in flexibility when their diameters are not small enough. Further, they are relatively fragile and apt to be broken by impact. Furthermore, they are heavy, because their specific gravity is comparatively large. In addition, the optical fibers themselves as well as their connectors are expensive. Due to these drawbacks, attempt has been made to replace glass materials by plastic materials. The advantages with plastic materials are numerous. For instance, the resulting optical fibers are light, tough and flexible even when their diameters are large. Further, for instance, their handling is easy and can be readily connected to light emitting and/or accepting elements.

In general, a plastic optical fiber comprises a core made of a plastic material having a larger refractive index and a good optical transmission and a cladding made of a plastic material having a smaller refractive index and a high transparency. In this structure, light is transmitted by reflection at the interface between the core and the cladding. Larger difference in refractive index between the plastic materials of the core and of the cladding provides the optical fiber with better optical transmission. As the plastic material having good optical transmission, amorphous plastics are preferred, examples of which are polymethyl methacrylate, polystyrene, etc. (cf. Japanese Patent Publication Nos. 8978/1968 and 21660/1978).

However, the optical fiber made of a plastic material produces a great decrease of optical transmission with the elevation of temperature and deteriorates the reliability as a light signal-transmitting medium. In addition, it is insufficient in heat resistance so that its use to transporting vehicles such as automobiles, vessels, aircrafts, robots, etc. is quite restricted. The maximum temperature at which polymethyl methacrylate and polystyrene can be used is about 80° C. When used at a temperature higher than about 80° C., they are deformed and their microstructures are fluctuated; the function as the optical fiber is thus damaged. When they are once used at a temperature higher than 80° C., the attenuation of light transmission is great even after cooling to room temperature, and they can be used only within a very restricted temperature range.

An optical fiber comprising a cladding made of vinylidene fluoride-hexafluoropropene copolymer in a liquid state is proposed (cf. Japanese Patent Publicaiton No. 8978/1968). However, its reexamination revealed that the said copolymer is excellent as a polymeric material for the cladding but the heat resistance is insufficient in the combination of any polymeric material for the core; the use of the resulting optical fiber is thus limited. For instance, the optical fiber wherein the core is made of a copolymer of methyl methacrylate with an alkyl acrylate (e.g. methyl acrylate, ethyl acrylate, butyl acrylate, 2-ethylhexyl acrylate) or a homopolymer of an alkyl methacrylate of which the alkyl moiety has 1 to 6 carbon atoms, and the cladding is made of the said copolymer is not sufficient in heat resistance.

As a result of the extensive study to provide an optical fiber having good heat resistance and optical transmission, it has now been found that the use of a polymer comprising units of a methacrylic ester having an alicyclic hydrocarbon group of not less than 8 carbon atoms in the ester moiety as a core material can achieve such object.

According to the present invention, there is provided a heat-resisting optical fiber comprising a core and a cladding, characterized in that the core is made of a polymer comprising units of a methacrylic ester, of which the ester moiety has an alicyclic hydrocarbon group of not less than 8 carbon atoms, and the cladding is made of a transparent polymeric material having a refractive index of at least 3% smaller than that of the core.

In the comparison with a conventional optical fiber comprising a core made of polymethyl methacrylate, the optical fiber of the invention is less in attenuation of light transmission with temperature elevation within a range of room temperature to about 80° C., the reliability being thus enhanced markedly. Further, the optical fiber of the invention shows little attenuation of light transmission at a high temperature at which the conventional optical fiber can never be used. Furthermore, the optical fiber shows favorable heat resistance and flexibility, particularly when the core is made of a polymer, especially of methacrylic esters, comprising units of the said methacrylic ester in a content of 3 to 30% by weight.

Of the said methacrylic ester, preferred are those of the formula:

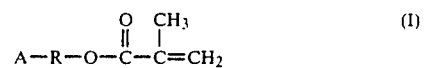

$$A-R-O-\overset{O}{\overset{\|}{C}}-\overset{CH_3}{\overset{|}{C}}=CH_2 \qquad (I)$$

wherein A is an alicyclic hydrocarbon group of not less than 8 carbon atoms and R is a single bond or a divalent hydrocarbon group of 1 or 2 carbon atoms. The monomer (I) may be prepared by esterifying methacrylic acid or its chloride with a monohydric alcohol of the formula: ROH wherein R is as defined above. Specific examples of the monohydric alcohol are 2,6-dimethylcyclohexanol, 2,2,5-trimethylcyclohexanol, 2-methylcamphanol, borneol, isoborneol, 3,7,7-trimethyl-4-hydroxy-bicyclo[4.1.0]heptane, 3-hydroxy-2,6,6-trimetyl-bicyclo[3.1.1]heptane, l-menthol, p-menthol-2, p-menthanol-8, octahydro-4,7-methanoinden-1-ylmethanol, octahydro-4,7-methanoinden-5-ol, fenchyl alcohol, 1-adamantanol, 2-adamantanol, 3,5-dimethyl-1-adamantanol, 3-ethyladamantanol, 3-methyl-5-ethyl-1-adamantanol, 3,5,8-triethyl-1-adamantanol, 3,5-dimethyl-8-ethyl-1-adamantanol, etc. The corresponding methacrylic esters of these monohydric alcohols are favorably usable. Particularly favorable are fenchyl methacrylate, 1-menthyl methacrylate, bornyl methacrylate, isobornyl methacrylate, 1-adamantyl methacrylate, 3,5-dimethyl-1-adamantyl methacrylate, etc.

When the methacrylic ester has an aromatic hydrocarbon group in place of the alicyclic hydrocarbon group in the ester moiety, the resulting core produces great attenuation of light transmission. The alicyclic hydrocarbon group having 10 to 20 carbon atoms is particularly favorable for improvement of the heat resistance. When the number of the carbon atoms contained in the alicyclic hydrocarbon group is more than 20, the mechanical strength is deteriorated. When the alicyclic hydrocarbon group has 7 or less carbon atoms, the heat resistance of the optical fiber is not improved. A straight hydrocarbon group of at least 8 carbon atoms does not improve the heat resistance.

The polymer to be used as the core material comprises usually from 3 to 100% by weight, preferably from 3 to 95% by weight of the said methacrylic ester. Most preferably, it comprises from 3 to 30% by weight of the methacrylic ester, thereby not only the heat resistance but also the flexibility can be improved.

When the polymer of the core material is a copolymer of the methacrylic ester, a monomer(s) to be copolymerized may be preferably chosen from $C_1$-$C_6$ alkyl acrylates and methacrylates. Examples of the alkyl moiety in the alkyl acrylates and methacrylates are methyl, ethyl, n-propyl, isopropyl, n-butyl, n-pentyl, cyclohexyl, etc. Specific examples of the alkyl acrylates and methacrylates are methyl acrylate, methyl methacrylate, ethyl acrylate, ethyl methacrylate, n-propyl acrylate, n-propyl methacrylate, n-butyl acrylate, n-butyl methacrylate, n-pentyl acrylate, n-pentyl methacrylate, cyclohexyl acrylate, cyclohexyl methacrylate, etc. In case of the content of the said methacrylic ester in the polymer being from 3 to 30% by weight, the use of methyl methacrylate as the co-monomer is favorable.

The polymer to be used as the core material according to the present invention has a high refractive index, which is one of the preferred characteristics for optical fibers.

The other essential component of the optical fiber, i.e. the cladding, is made of a transparent polymeric material having a refractive index of at least 3% smaller than that of the core material. When the refractive index of the cladding material is smaller than that of the core material in less than 3%, the light reflection by the cladding is small, and the attenuation of light transmission is great.

Examples of the transparent polymeric material are transparent resins such as polymers and copolymers of vinyl fluoride, vinylidene fluoride, trifluoroethylene, tetrafluoroethylene, hexafluoropropene, trifluoromethyl trifluorovinyl ether, perfluoropropyl trifluorovinyl ether and perfluoro-t-butyl methacrylate, thermoplastic fluororubbers, copolymers of said fluoromonomers with alkyl methacrylates (e.g. methyl methacrylate, ethyl methacrylate) and their mixtures with polyalkyl methacrylates (e.g. polymethyl methacrylate, polyethyl methacrylate). Among them, vinylidenefluoride-tetrafluoroethylene copolymer, vinylidene fluoride-trifluoroethylene copolymer, vinylidene fluoride-tetrafluoroethylene-hexafluoropropene terpolymer, polyperfluoro-t-butyl methacrylate, thermoplastic fluororubbers, etc. are preferred.

The term "thermoplastic fluororubbers" as hereinabove used is intended to mean polymers which comprises soft segments of fluorine-containing rubbers and hard segments of fluorine-containing resins and can be physically vulcanized in the part of fluorine-containing resins at room temperature to show a rubbery elasticity and behave as thermoplastics at high temperatures over the melting point. A typical example of such thermoplastic fluororubbers is "Dai-el" thermoplastic manufactured by Daikin Kogyo Co., Ltd.

Other examples of the transparent polymeric material are transparent rubbers such as vinylidene fluoride-haxafluoropropene copolymer, vinylidene fluoride-pentafluoropropene copolymer, vinylidene fluoride-chlorotrifluoroethylene copolymer, etc. Among them, vinylidene fluoride-hexafluoropropene copolymer is preferred. Further, these transparent rubbers may comprise any crosslinking agent so that the cladding material made thereof can be crosslinked by heat treatment or light irradiation, particularly after coating on the core material, whereby the heat resistance of the optical fiber is markedly enhanced. Specific examples of the crosslinking agent are amines, polyols, organic peroxides, etc.

Preferably, the transparent resin or rubber is not crystalline but nearly amorphous and has a refractive index of not more than 1.42. It is favorable to have a good adhesiveness to the core material.

The polymer to be used as the core material may be prepared by a per se conventional polymerization procedure such as suspension polymerization or bulk polymerization. In such preparation, a great care should be taken to prevent the contamination of any foreign material into the produced polymer. For instance, the suspension polymerization usually requires the use of water and a suspension stabilizer in great amounts so that any foreign material contained therein would tend to be included in the produced polymer. Any foreign material may also contaminate the produced polymer during the operation of dehydration therefrom. Because of this reason, it is preferred to carry out the polymerization in the air cleaned to eliminate any floating material therein and to apply any cleaning or purification operation such as filtration and washing to the starting materials and/or the produced polymer.

The polymerization may be initiated by the use of a radical initiator, of which examples are azo compounds (e.g. 2,2'-azobis(isobutyronitrile), 1,1'-azobis(cyclohexanecarbonitrile), 2,2'-azobis(2,4-dimethylvaleronitrile), azobisisobutanol diacetate, azo-t-butane), organic peroxides (e.g. di-t-butyl peroxide, dicumyl peroxide, methyl ethyl ketone petoxide, di-t-butyl perphthalate, di-t-butyl peracetate, di-t-amyl peroxide), etc. In order to control the molecular weight of the polymer, a chain transfer agent may be added to the polymerization system. Specific examples of the chain transfer agent are t-butylmercaptan, n-butylmercaptan, n-octylmercaptan, n-dodecyl mercaptan, etc. The amount of the chain transfer agent is usually not more than 1 mol % of the monomer.

The production of the polymeric material for the cladding material may be also accomplished in a per se conventional polymerization procedure. However, such great care as taken in the preparation of the core material is not needed.

In one of the favorable procedures for preparation of the optical fiber of the invention, the production of the polymer for the core material comprising the continuous bulk polymerization at an elevated temperature and the subsequent elimination of volatile materials containing unreacted monomers from the polymerization product, and the manufacture of the optical fiber are carried out successively. In another favorable procedure, the polymer for the core material is produced by bulk polymerization, and subsequently the produced polymer and the polymeric material as the cladding material are co-extruded to make respectively the core and the cladding as an integral body.

The optical fiber of the invention has usually a diameter of from about 0.20 mm to 2.0 mm. The cladding material is coated on and around the core material in an amount of from about 5 to 25% by weight of the core material.

The optical fiber of the invention comprises the core of the specific polymer and the cladding of the specific polymeric material and has exellent heat resistance and flexibility. Since the optical fiber is stable even at a high temperature over 110° C., it can be applied to automobiles, vessels, aircrafts, robots, etc. Further, it will have wide application in communication in premises or buildings.

Practical and presently preferred embodiments of the present invention are shown in the following Examples wherein parts and % are by weight unless otherwise indicated.

In these examples, the attenuation of light transmission was measured as follows:

As the illuminant, a halogen-tungsten lamp was employed. Using a diffraction grating spectrophotometer, the intensities of the outputs from the optical fiber to be tested and from the standard optical fiber at a wavelength of 650 nm were read off by means of a silicone photodiode. The attenuation of light transmission ($\alpha$) was calculated according to the following equation:

$$\alpha(dB/Km) = \frac{10}{L} \log\left(\frac{I}{I_o}\right)$$

wherein L is the length of the optical fiber (Km), $I_o$ is the intensity of light at the entrance and I is the intensity of light at the exit.

The heat resistance of the optical fiber was evaluated by heating the optical fiber at a predetermined temperature for a predetermined period of time and comparing the optical transmission loss before and after heating.

The flexibility of the optical fiber was evaluated by winding the optical fiber around a rod and determining the minimum radius (r) of the rod at which the optical fiber was broken.

EXAMPLE 1

A monomeric mixture of 1-adamantyl methacrylate purified by distillation under reduced pressure. (87 parts) and methyl acrylate (13 parts) containing n-dodecyl mercaptan (0.05 part) and 2,2'-azobis(2,4-dimethylvaleronitrile) (0.05 part) was prepared in the absence of oxygen, charged in a reactor kept at 150° C. and subjected to prepolymerization with a retention time of 8 hours. The prepolymerized mixture was then introduced into a screw conveyor kept at 200° C. and polymerized with a retention time of 2 hours to obtain a copolymer. Intrinsic viscosity [$\eta$] (25° C., chloroform), 0.70. Refractive index, 1.547.

The thus produced polymer was charged in a vented extruder kept at 255° C. The polymer was extruded from the central portion of a coextruder die kept at 235° C. to form a strand of 1 mm in diameter as a core, while vinylidene fluoride-tetrafluoroethylene copolymer (vinylidene fluoride content, 70 mol %; refractive index, 1.405; melt flow index at 230° C., 140) was melt coated on the surface of the core strand to form a strand in a core-cladding structure. The weight ratio of the core portion and the cladding portion was 90:10.

In order to impart mechanical toughness, the thus formed strand was stretched at a stretch ratio of 1.8 to obtain an optical fiber of about 0.75 mm in diameter.

The attenuations of light transmission at a wavelength of 650 nm as measured at 25° C. and 70° C. were 340 dB/Km and 370 dB/Km, respectively. The attenuation after heated for 3 hours at 120° C. was 400 dB/Km. This means that the optical fiber as above prepared has a good heat resistance.

EXAMPLES 2 TO 6

In the same manner as in Example 1 but using polymers as shown in Table 1, optical fibers were prepared. The attenuations before and after heating were as shown in Table 1. From such results, it is understood that the optical fibers have good heat resistance.

TABLE 1

| Example No. | Polymer for core Monomers (%) | [$\eta$] (25° C., CHCl$_3$) | Refractive index | Polymeric material for cladding Monomers (mol %) | Refractive index | Attenuation of light transmission (dB/km, 650 nm) Before heating 25° C. | 70° C. | After heating (temp. × hrs.) |
|---|---|---|---|---|---|---|---|---|
| 2 | 3,5-Dimethyladamantyl methacrylate/Methyl acrylate (50:50) | 0.65 | 1.52 | Vinylidene fluoride/ Tetrafluoroethylene (80:20) | 1.41 | 420 | 470 | 500 (150° C. × 3 hrs.) |
| 3 | Isobornyl methacrylate/Ethyl acrylate (90:10) | 0.90 | 1.50 | Vinylidene fluoride/ Tetrafluoroethylene Hexafluoropropene (60:35:5) | 1.38 | 350 | — | 400 (110° C. × 3 hrs.) |
| 4 | p-Menthyl methacrylate/Methyl methacrylate/Ethyl acrylate (90:3:7) | 0.72 | 1.49 | Perfluoro-t-butyl methacrylate (100) | 1.36 | 400 | — | 420 (105° C. × 7 hrs.) |
| 5 | 2-Methylcamphyl methacrylate/Butyl acrylate (95:5) | 0.60 | 1.51 | Vinylidene fluoride/ Tetrafluoroethylene (70:30) | 1.40 | 370 | — | 450 (115° C. × 3 hrs.) |
| 6 | 2,2,5-Trimethylcyclohexyl methacrylate/Methyl methacrylate (90:10) | 0.55 | 1.49 | Vinylidene fluoride/ Tetrafluoroethylene (70:30) | 1.40 | 420 | — | 470 (110° C. × 3 hrs.) |

EXAMPLE 7

A monomeric mixture of fenchyl methacrylate purified by distillation under reduced pressure (25 parts), methyl methacrylate (75 parts) and methyl acrylate (3 parts) containing n-dodecyl mercaptan (0.05 part) and 2,2'-azobis-(2,4-dimethylvaleronitrile) (0.10 part) was prepared in the absence of oxygen, charged in a reactor kept at 150° C. and subjected to prepolymerization with a retention time of 8 hours. The prepolymerized mixture was then introduced into a screw conveyor kept at 200° C. and polymerized with a retention time of 2 hours to obtain a copolymer. Intrinsic viscosity [η] (25° C., chloroform), 0.70. Refractive index, 1.490.

The thus produced polymer was charged in a vented extruder kept at 255° C. The polymer was extruded from the central portion of a coextruder die kept at 235° C. to form a strand of 1 mm in diameter as a core, while vinylidene fluoride-tetrafluoroethylene copolymer (vinylidene fluoride content, 70% by mole; refractive index, 1.405; melt flow index at 230° C., 140) was melt coated on the surface of the core strand to form a strand in a core-cladding structure. The weight ratio of the core portion and the cladding portion was 90:10.

In order to impart mechanical toughness, the thus formed strand was stretched at a draw ratio of 1.8 to obtain an optical fiber of about 0.75 mm in diameter.

The attenuations of light transmission at a wavelength of 650 nm as measured at 25° C. and 70° C. were 340 dB/Km and 370 dB/Km, respectively. The attenuation after being heated for 6 hours at 120° C. was 380 dB/Km. The flexibility was r=5 mm.

EXAMPLES 8 TO 12

In the same manner as in Example 7 but using polymers as shown in Table 2, optical fibers of from 0.85 to 0.75 mm in diameter were prepared. Their attenuations of light transmission before and after heating and their flexibilities are shown in Table 2.

and methyl acrylate (3 parts) containing n-dodecyl mercaptan (0.05 part) and 2,2'-azobis(2,4-dimethylvaleronitrile) (0.10 part) was prepared in a stream of nitrogen filtered by means of a porous film to eliminate suspending materials, charged in a reactor kept at 150° C. and subjected to prepolymerization with a retention time of 8 hours. The prepolymerized mixture was then introduced into a screw conveyor kept at 200° C. and polymerized with a retention time of 2 hours to obtain a copolymer. Intrinsic viscosity [η] (25° C., chloroform), 0.70. Refractive index, 1.49.

The thus produced polymer was charged in a vented extruder kept at 255° C. The polymer was extruded from the central portion of a coextruder die kept at 235° C. with exhausting the unreacted monomers to form a strand of 1 mm in diameter as a core, while a 30% solution of vinylidene fluoride-hexafluoropropene copolymer (hexafluoropropene content, 30%; Mooney viscosity (ML$_{1+10}$) at 100° C., 100) in ethyl acetate was coated on the surface of the core strand to form a strand in a core-cladding structure. The thickness of the cladding portion was about 10 microns.

The attenuations of light transmission at a wavelength of 650 nm as measured at 25° C. and 70° C. were 300 dB/Km and 320 dB/Km, respectively. The attenuation after heated for 10 hours at 130° C. was 340 dB/Km. The flexibility was r=5 mm.

EXAMPLES 14 TO 17

In the same manner as in Example 13 but using polymers as shown in Table 3, optical fibers of 0.85 to 0.75 mm in diameter were prepared. Their attenuations of light transmission before and after heating and their flexibilities are shown in Table 3.

TABLE 2

| Example No. | Polymer for core Monomers (%) | [η] (25° C., CHCl$_3$) | Refractive index | Polymeric material for cladding Monomers (mol %) | Refractive index | Attenuation of light transmission (dB/km, 650 nm) Before heating 25° C. | 70° C. | After heating (temp. × hrs.) | Flexibility (mm) |
|---|---|---|---|---|---|---|---|---|---|
| 8 | Fenchyl methacrylate/Methyl methacrylate/Methyl acrylate (10:87:3) | 0.90 | 1.49 | Vinylidene fluoride/Tetrafluoroethylene (80:20) | 1.41 | 420 | — | 470 (125° C. × 6 hrs.) | 5 |
| 9 | 1-Adamantyl-methacrylate/Methyl methacrylate/Butyl acrylate (5:93:2) | 0.72 | 1.50 | Vinylidene fluoride/Tetrafluoroethylene Hexafluoropropene (60:35:5) | 1.38 | 440 | 440 | 450 (110° C. × 10 hrs.) | 5 |
| 10 | 1-Menthyl methacrylate/Methyl methacrylate/Methyl acrylate (25:73:2) | 0.60 | 1.49 | Vinylidene fluoride/Tetrafluoroethylene (70:30) | 1.40 | 500 | — | 500 (115° C. × 7 hrs.) | 10 |
| 11 | Bornyl methacrylate/Methyl methacrylate/Methyl acrylate (15:83:2) | 0.55 | 1.49 | Perfluoro-t-butyl methacrylate (100) | 1.36 | 400 | 420 | 420 (105° C. × 3 hrs.) | 20 |
| 12 | Fenchyl methacrylate/Methyl methacrylate/Methyl acrylate (15:83:2) | 0.91 | 1.49 | Thermoplastic fluoro-rubber ("Dia-el T-530" manufactured by Daikin Kogyo Co., Ltd) | 1.39 | 350 | 470 | 470 (125° C. × 20 hrs.) | 5 |

EXAMPLE 13

A monomeric mixture of bornyl methacrylate purified by distillation under reduced pressure (75 parts)

TABLE 3

| Example No. | Polymer for core Monomers (%) | [η] (25° C., CHCl₃) | Refractive index | Polymeric material for cladding Monomers (mol %) | Crosslinking agent | Attenuation of light transmission (dB/km, 650 nm) Before heating 25° C. | 70° C. | After heating (temp. × hrs.) | Flexibility (mm) |
|---|---|---|---|---|---|---|---|---|---|
| 14 | Bornyl methacrylate/ Methyl methacrylate/ Methyl acrylate (15:83:2) | 0.55 | 1.49 | Vinylidene fluoride/ Hexafluoropropene ("Dai-el G-501" manufactured by Daikin Kogyo Co., Ltd.) | Amine | 420 | 420 | 420 (125° C. × 6 hrs.) | 5 |
| 15 | Fenchyl methacrylate/ Methyl methacrylate/ Methyl acrylate (10:87:3) | 0.90 | 1.49 | Vinylidene fluoride/ Hexafluoropropene ("Dai-el G-701" manufactured by Daikin Kogyo Co., Ltd.) | Polyol | 420 | — | 470 (110° C. × 10 hrs.) | 5 |
| 16 | l-Menthyl methacrylate/ Methyl methacrylate/ Methyl acrylate (25:73:2) | 0.60 | 1.49 | Vinylidene fluoride/ Chlorotrifluoethylene ("Kel-F elastomer No. 3700" manufactured by 3M) | None | 500 | — | 500 (110° C. × 7 hrs.) | 10 |
| 17 | l-Adamantyl methacrylate/Methyl methacrylate/ butyl acrylate (5:93:2) | 0.72 | 1.50 | Vinylidene fluoride/ Hexafluoropropene ("Dai-el G-901" manufactured by Daikin Kogyo Co., Ltd.) | Organic peroxide | 440 | 440 | 450 (110° C. × 10 hrs.) | 5 |

EXAMPLE 18

A monomeric mixture of bornyl methacrylate, methyl methacrylate and methyl acrylate containing a suspension stabilizer, an organic peroxide and water was prepared under a stream of nitrogen filtered through a porous film to eliminate suspending materials and suspension polymerized to give a copolymer consisting of units of bornyl methacrylate, methyl methacrylate and methyl acrylate in a weight ratio of 14:84:2. Intrinsic viscosity [η] (25° C., chloroform), 0.70. Refractive index, 1.49.

The thus produced polymer was charged in a vented extruder kept at 270° C. The polymer was extruded from the central portion of a coextruder die kept at 235° C. with exhausting the unreacted monomers to form a strand of 1 mm in diameter as a core, while a 30% solution of vinylidene fluoride-hexafluoropropene copolymer ("Dai-el G-901" manufactured by Daikin Kogyo Co., Ltd.) in ethyl acetate was coated on the surface of the core strand to form a strand in a core-cladding structure. The thickness of the cladding portion was about 10 microns.

The attenuation of light transmission at a wavelength of 650 nm as measured at 25° C. was 350 dB/Km. The attenuation after heated for 10 hours at 130° C. was 360 dB/Km. The flexibility was r=5 mm.

COMPARATIVE EXAMPLE 1

In the same manner as in Example 1 but using polymethyl methacrylate as a core material, an optical fiber was prepared. The attenuations of light transmission at a wavelength of 650 nm as measured at 25° C. and 70° C. were 350 dB/Km and 500 dB/Km, respectively. The attenuation after heated for 7 hours at 105° C., 3 hours at 110° C., 3 hours at 120° C. or 3 hours at 150° C. was more than 1,000 dB/Km in each case. Thus, this optical fiber is inferior in heat resistance.

An optical fiber having a core made of polybenzyl methacrylate or poly-n-octyl methacrylate gave an attenuation of more than 1,000 dB/Km after heated for 2 hours at 100° C. Thus, this optical fiber is inferior in heat resistance.

COMPARATIVE EXAMPLE 2

In the same manner as in Example 7 but using a copolymer of bornyl methacrylate (2 parts), methyl methacrylate (98 parts) and methyl acrylate (3 parts) as a core material, an optical fiber having a diameter of about 0.85 mm was prepared. The flexibility of the optical fiber was r=5 mm. The attenuations of light transmission at a wavelength of 650 nm as measured at 25° C. and 70° C. were 350 dB/Km and 500 dB/Km, respectively. The attenuation after heated for 7 hours at 105° C., 3 hours at 110° C., 3 hours at 120° C. or 3 hours at 150° C. was more than 1,000 dB/Km. Thus, this optical fiber is inferior in heat resistance, although the flexibility is good.

COMPARATIVE EXAMPLE 3

In the same manner as in Example 7 but using a copolymer of l-menthyl methacrylate (40 parts), methyl methacrylate (60 parts) and methyl acrylate (3 parts) as a core material, an optical fiber having a diameter of 0.45 mm was prepared. The flexibility of the optical fiber was r=100 mm. The attenuation of light transmission at a wavelength of 650 nm at 25° C. was 400 dB/Km. The attenuation after heated for 12 hours at 130° C. was 420 dB/Km. Thus, this optical fiber is inferior in flexibility, although the heat resistance is good.

COMPARATIVE EXAMPLE 4

In the same manner as in Example 13 but using a copolymer of bornyl methacrylate (2 parts), methyl methacrylate (98 parts) and methyl acrylate (3 parts) as a core material, an optical fiber having a diameter of about 0.85 mm was prepared. The flexibility of the optical fiber was r=5 mm. The attenuations of light transmission at a wavelength of 650 nm measured at 25° C. and 70° C. were 350 dB/Km and 500 dB/Km, respectively. The attenuation after heated for 7 hours at 105° C., 3 hours at 110° C., 3 hours at 120° C. or 3 hours at 150° C. was more than 1,000 dB/Km. Thus, this optical fiber is good in flexibity, but the heat resistance is inferior.

An optical fiber having a core made of benzyl methacrylate or n-octyl methacrylate had an attenuation of more than 1,000 dB/Km after heated for 2 hours at 100° C. Thus, this optical fiber is inferior in heat resistance.

COMPARATIVE EXAMPLE 5

In the same manner as in Example 13 but using a copolymer of l-menthyl methacrylate (40 parts), methyl methacrylate (60 parts) and methyl acrylate (3 parts) as a core material and the same cladding material as employed in Example 1, an optical fiber having a diameter of 0.45 mm was prepared. The flexibility of the optical fiber was r=100 mm. The attenuation of light transmission at a wavelength as measured at 25° C. was 400 dB/Km. The attenuation after heated for 12 hours at 130° C. was 420 dB/Km. Thus, this optical fiber is good in heat resistance but inferior in flexibility.

COMPARATIVE EXAMPLE 6

In the same manner as in Example 13 but using a copolymer of methyl methacrylate (95 parts) and ethyl acrylate (5 parts) as a core material, an optical fiber having a diameter of 0.80 mm was prepared. The attenuation of light transmission at a wavelength of 650 nm as measured at 25° C. was 320 dB/Km. When the optical fiber was heated for 12 hours at 130° C., any fibrous form could not be maintained.

What is claimed is:

1. A heat-resisting optical fiber comprising a core and a cladding, characterized in that the core is made of a polymer comprising 3 to 100% by weight of units of the methacrylic ester and 97 to 0% by weight of units of at least one member selected from the group consisting of $C_1$-$C_6$ alkyl acrylate and $C_1$-$C_6$ alkyl methacrylate, of which the ester moiety has an alicyclic hydrocarbon group of not less than 8 carbon atoms, and the cladding is made of a transparent polymeric material having a refractive index of at least 3% smaller than that of the core.

2. The optical fiber according to claim 2, wherein the polymer for the core comprises 3 to 30% by weight of units of the methacrylic ester and 97 to 70% by weight of units of methyl methacrylate.

3. The optical fiber according to claim 1, wherein the methacrylic ester has the formula:

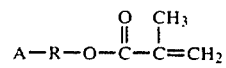

wherein A is an alicyclic hydrocarbon group having at least 8 carbons atoms and R is a single bond or a divalent hydrocarbon group having 1 or 2 carbon atoms.

4. The optical fiber according claim 3, wherein methacrylic ester is the one selected from the group consisting of fenchyl methacrylate, l-menthyl methacrylate, bornyl methacrylate, isobornyl methacrylate, adamantyl methacrylate and dimethyladamantyl methacrylate.

5. The optical fiber according to claim 1, wherein the polymeric material for the cladding is a resin.

6. The optical fiber according to claim 5, wherein the resin is selected from the group consisting of vinylidene fluoride-tetrafluoroethylene copolymer, vinylidene fluoride-trifluoroethylene copolymer, vinylidene floride-tetrafluoroethylene-hexafluoropropene terpolymer, poly(perfluoro-tert-butyl) methacrylate and thermoplastic fluororubber.

7. The optical fiber according to claim 1, wherein the polymeric material for the cladding is a fluororubber.

8. The optical fiber according to claim 7, wherein the fluororubber is vinylidene fluoride-hexafluoropropene copolymer, vinylidene fluoride-pentafluoropropene copolymer and vinylidene fluoride-chlorotrifluoroethylene copolymer.

9. The optical fiber according to claim 7, wherein the fluororubber comprises a crosslinking agent.

10. A heat-resisting optical fiber comprising a core and a cladding, characterized in that the core is made of a polymer comprising 3 to 30% by weight of units of the methacrylic ester and 97 to 70% by weight of units of methyl methacrylate, of which the ester moiety has an alicyclic hydrocarbon group of not less than 8 carbon atoms, and the cladding is made of a transparent polymeric material having a refractive index of at least 3% smaller than that of the core.

* * * * *